US009815022B2

(12) United States Patent
Lee et al.

(10) Patent No.: US 9,815,022 B2
(45) Date of Patent: Nov. 14, 2017

(54) DEVICE FOR EXHAUSTING CARBON DIOXIDE ASSOCIATED WITH HEATING OR AIR-CONDITIONING DEVICE

(71) Applicant: SOGANG UNIVERSITY RESEARCH FOUNDATION, Seoul (KR)

(72) Inventors: Tae-Soo Lee, Gyeonggi-do (KR); Jung-Hyuk Cho, Seoul (KR)

(73) Assignee: SOGANG UNIVERSITY RESEARCH FOUNDATION, Seoul (KR)

( * ) Notice: Subject to any disclaimer, the term of this patent is extended or adjusted under 35 U.S.C. 154(b) by 0 days.

(21) Appl. No.: 15/009,815

(22) Filed: Jan. 28, 2016

(65) Prior Publication Data

US 2016/0220944 A1 Aug. 4, 2016

(30) Foreign Application Priority Data

Jan. 30, 2015 (KR) ........................ 10-2015-0015403

(51) Int. Cl.
*B01D 53/04* (2006.01)
*B01D 53/62* (2006.01)
*B01D 53/26* (2006.01)

(52) U.S. Cl.
CPC .......... *B01D 53/62* (2013.01); *B01D 53/0438* (2013.01); *B01D 53/265* (2013.01);
(Continued)

(58) Field of Classification Search
CPC ............ B01D 53/0438; B01D 53/0454; B01D 53/0462; B01D 53/265; B01D 53/62;
(Continued)

(56) References Cited

U.S. PATENT DOCUMENTS 8,157,892 B2 * 4/2012 Meirav ................ F24F 3/0442
95/114
2012/0160099 A1 * 6/2012 Shoji .................... B01D 53/025
95/139

(Continued)

FOREIGN PATENT DOCUMENTS

JP 2008-238017 10/2008
KR 10-20030052388 A 6/2003

(Continued)

*Primary Examiner* — Frank Lawrence
(74) *Attorney, Agent, or Firm* — Rabin & Berdo, P.C.

(57) ABSTRACT

A device for exhausting carbon dioxide includes: at least one carbon dioxide adsorber which is configured to be able to be electrically heated; and a heat radiating part of a heating device for heating an interior space. A carbon dioxide exhausting process is repeatedly performed. The carbon dioxide exhausting process includes: a first process of urging interior air to pass through the carbon dioxide adsorber and then to be introduced into an interior space; a second process of urging interior air to pass sequentially through the carbon dioxide adsorber and the heat radiating part in a state that the carbon dioxide adsorber is electrically heated and to be exhausted to an exterior space; and a third process of urging exterior air to pass sequentially through the heat radiating part and the carbon dioxide adsorber and then to be introduced into an interior space after the second process.

12 Claims, 9 Drawing Sheets

(52) U.S. Cl.
CPC .. *B01D 2253/108* (2013.01); *B01D 2257/504* (2013.01); *B01D 2258/06* (2013.01); *B01D 2259/402* (2013.01); *B01D 2259/4009* (2013.01); *F24F 2203/026* (2013.01); *Y02C 10/04* (2013.01); *Y02C 10/08* (2013.01)

(58) Field of Classification Search
CPC .......... B01D 2253/108; B01D 2258/06; B01D 2259/40009; B01D 2259/40086; B01D 2259/4004; B01D 2259/40096; B01D 2259/402; F24F 2203/026; Y02C 10/08
USPC ............ 95/8, 11, 14, 139, 148; 96/108, 111, 96/112, 121
See application file for complete search history.

(56) References Cited

U.S. PATENT DOCUMENTS

| | | | | |
|---|---|---|---|---|
| 2014/0020559 | A1* | 1/2014 | Meirav | B01D 53/0438 95/148 |
| 2014/0202183 | A1* | 7/2014 | Chadwick | A23L 3/3418 62/78 |
| 2015/0078964 | A1* | 3/2015 | Meirav | B01D 53/0407 422/120 |
| 2015/0321135 | A1* | 11/2015 | Meirav | B01D 53/346 95/127 |

FOREIGN PATENT DOCUMENTS

| | | |
|---|---|---|
| KR | 10-20050063253 A | 6/2005 |
| KR | 10-0836021 B1 | 6/2008 |
| KR | 10-2008-0075290 A | 8/2008 |

* cited by examiner

[FIG. 1]
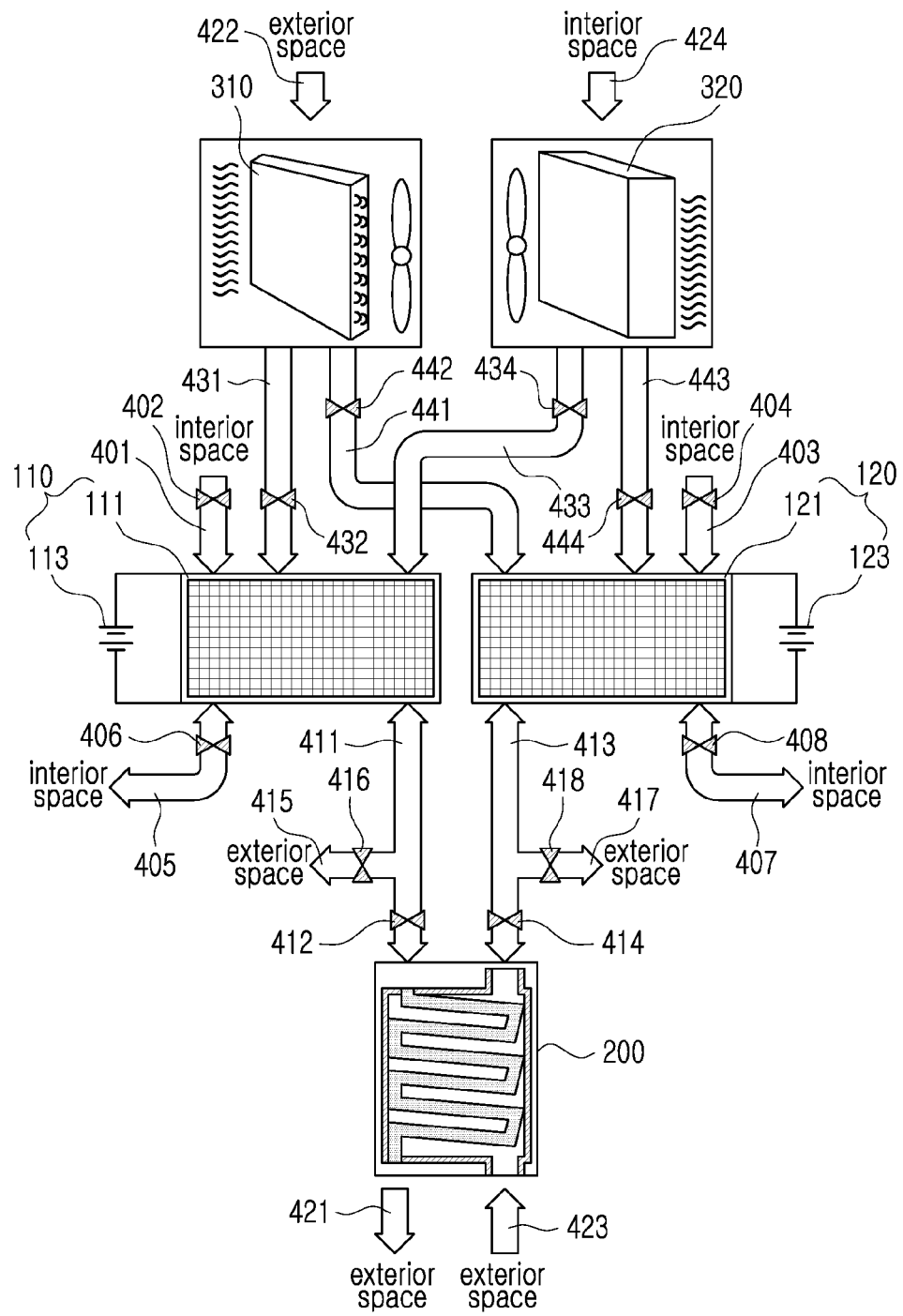

[FIG. 2]
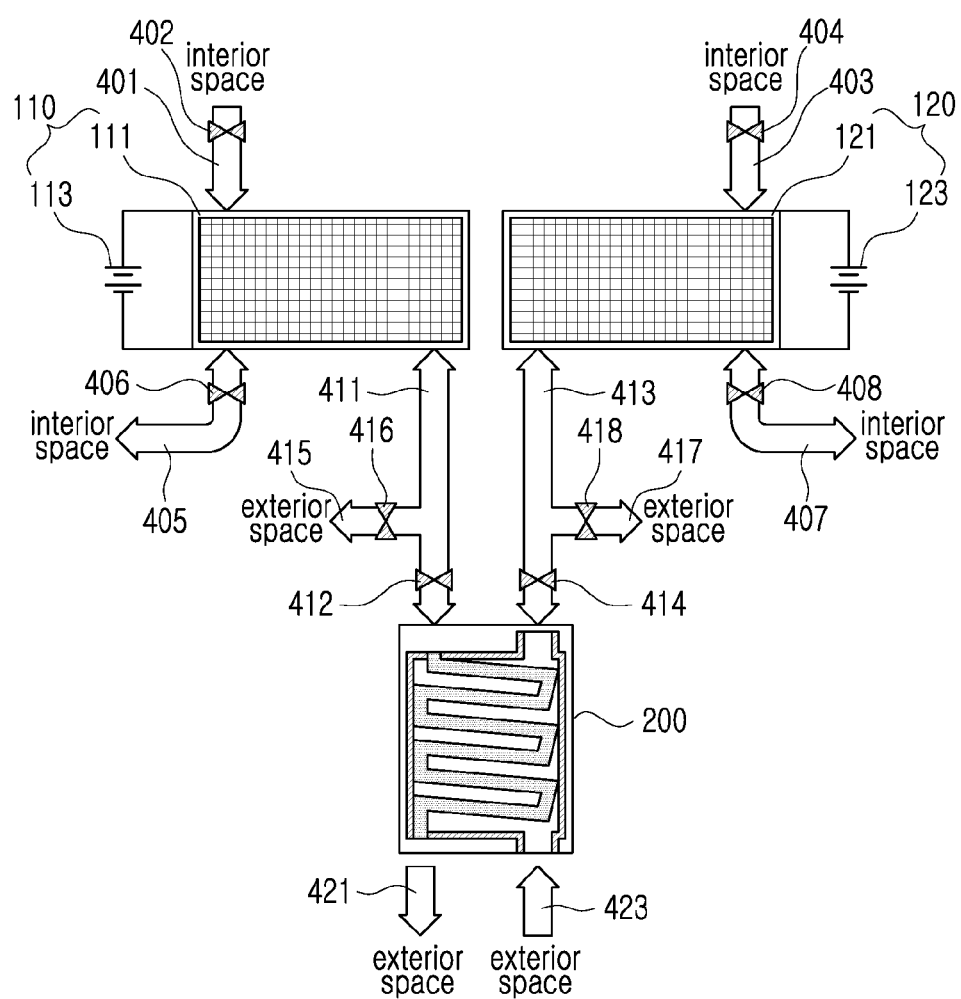

[FIG. 3]
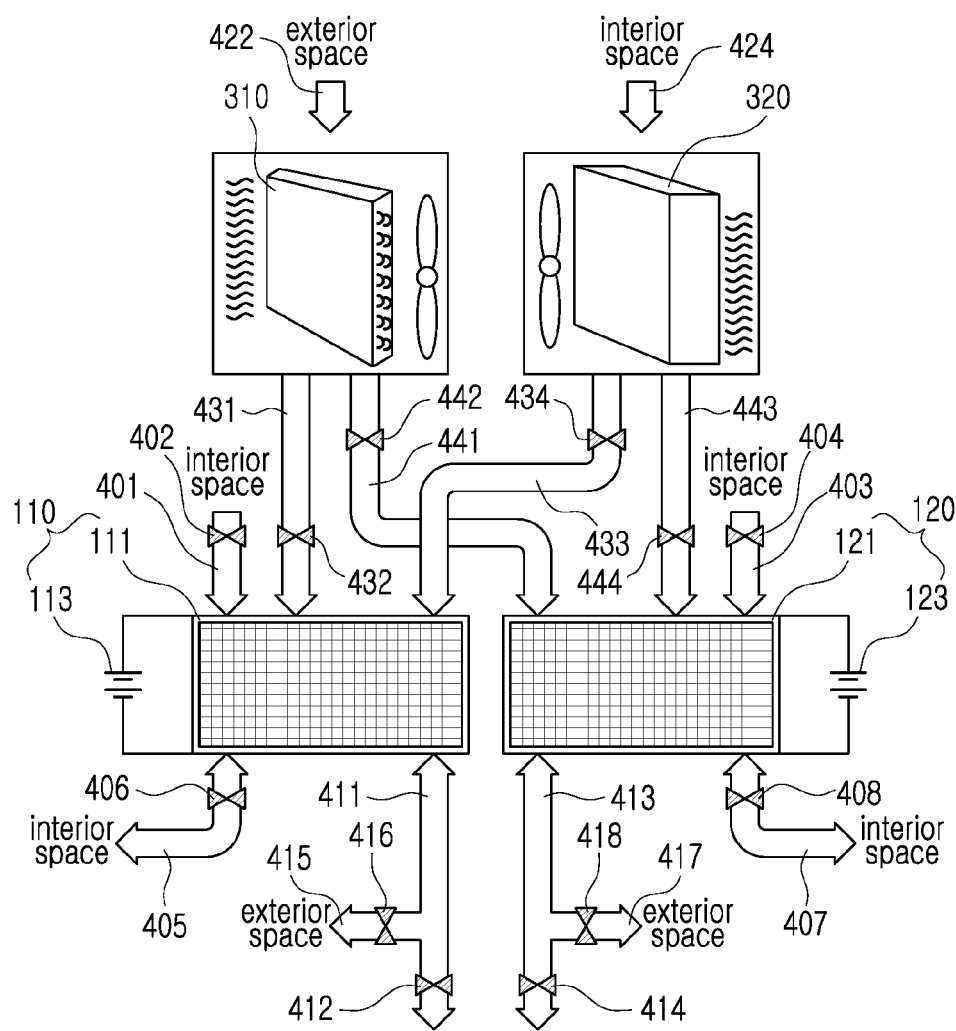

[FIG. 4a]
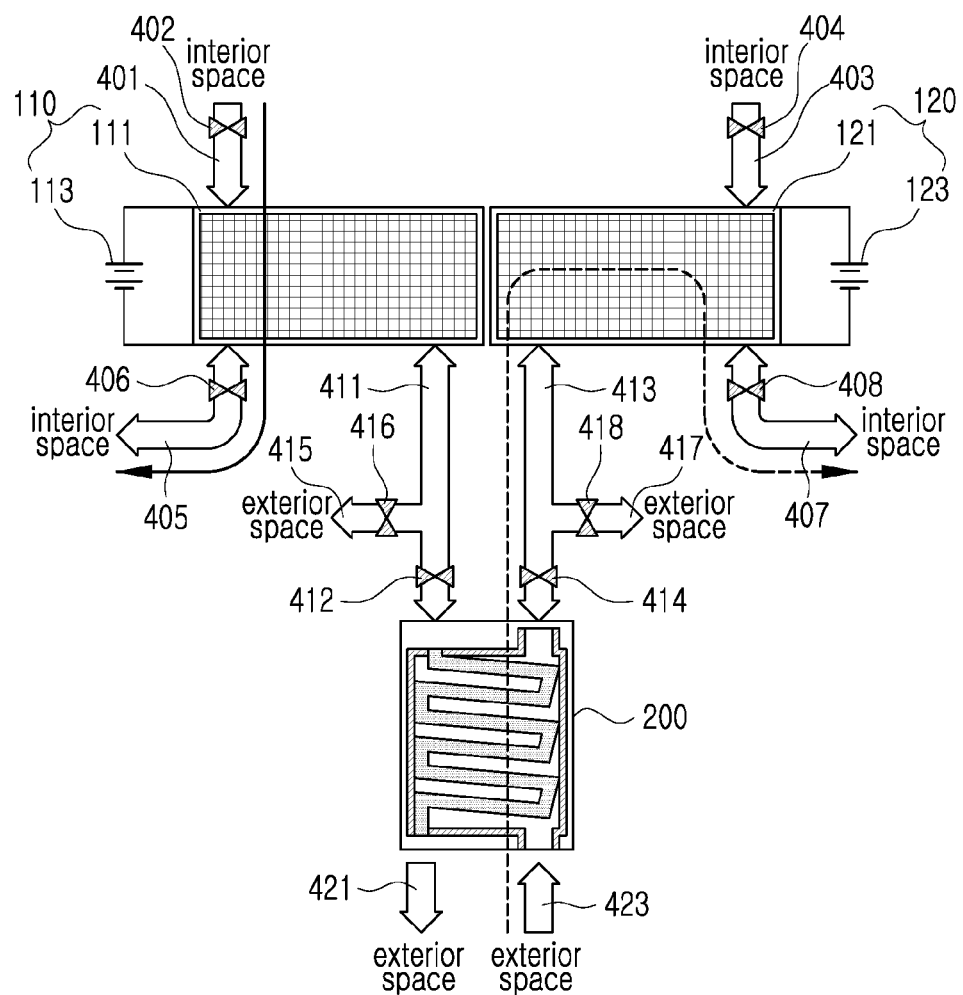

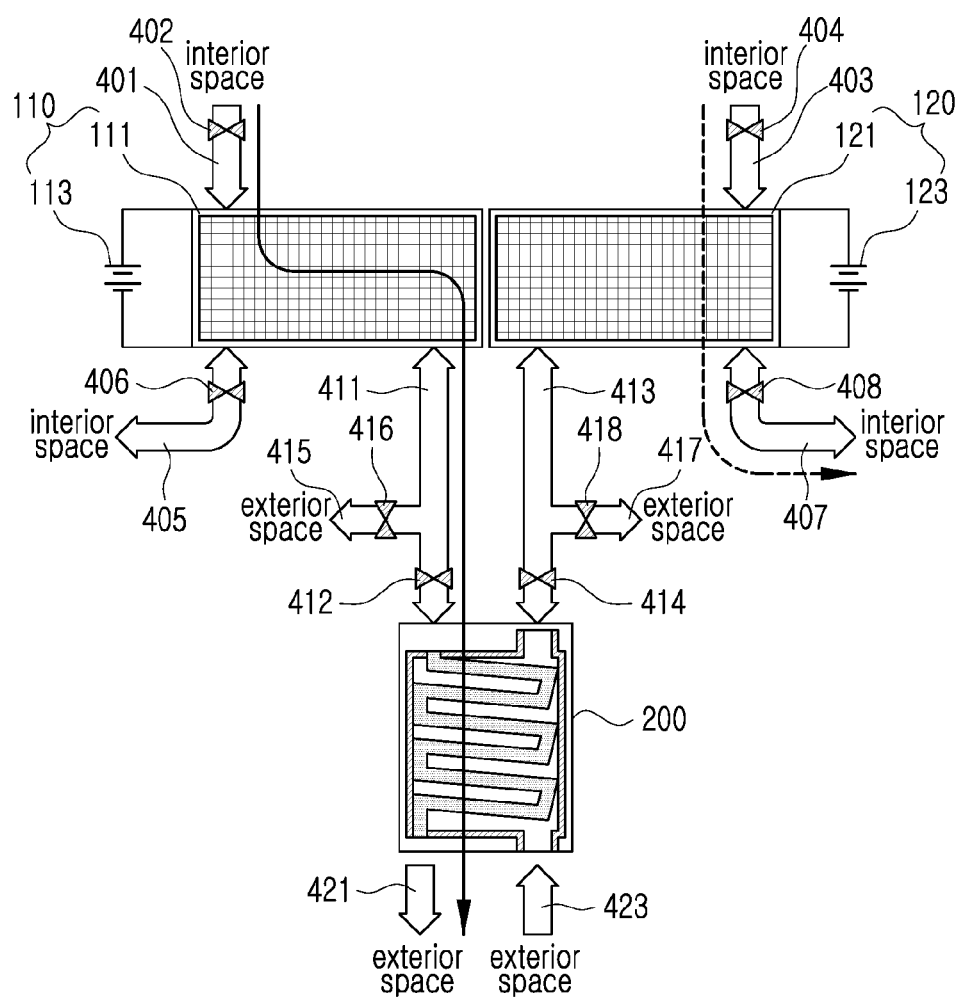
[FIG. 4b]

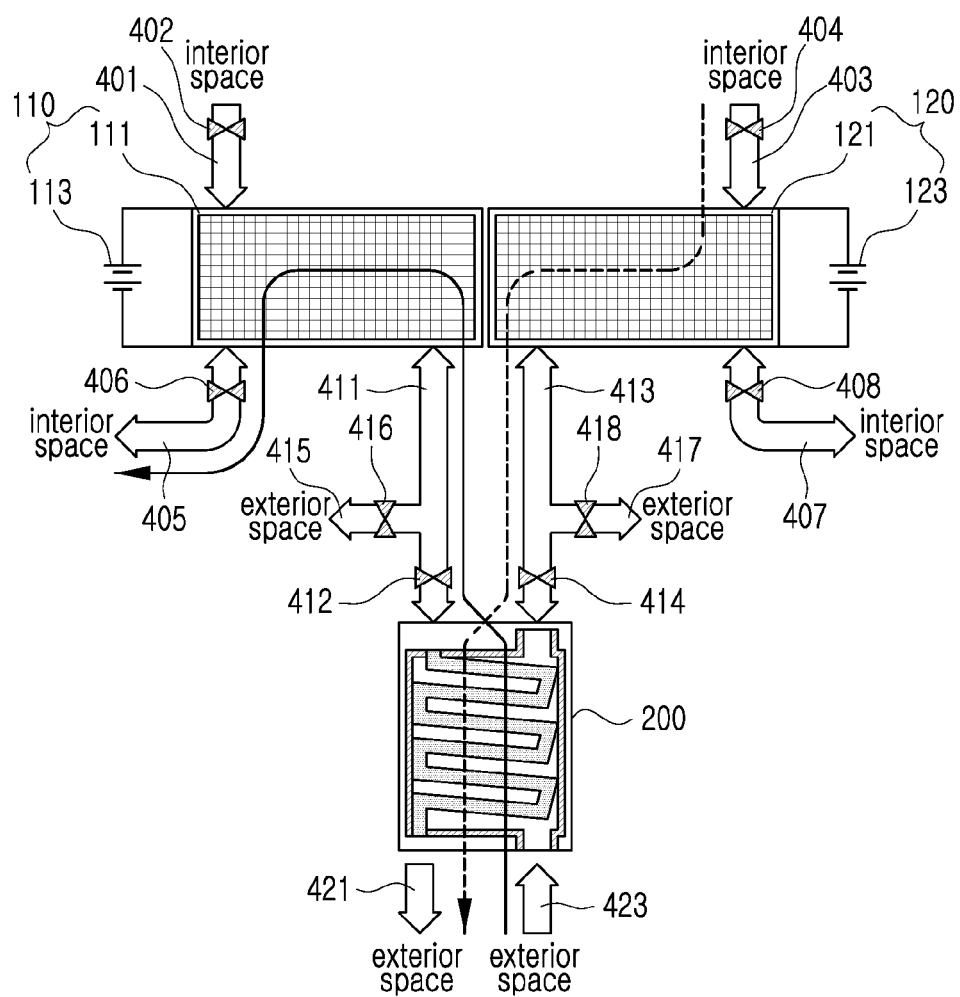
[FIG. 4c]

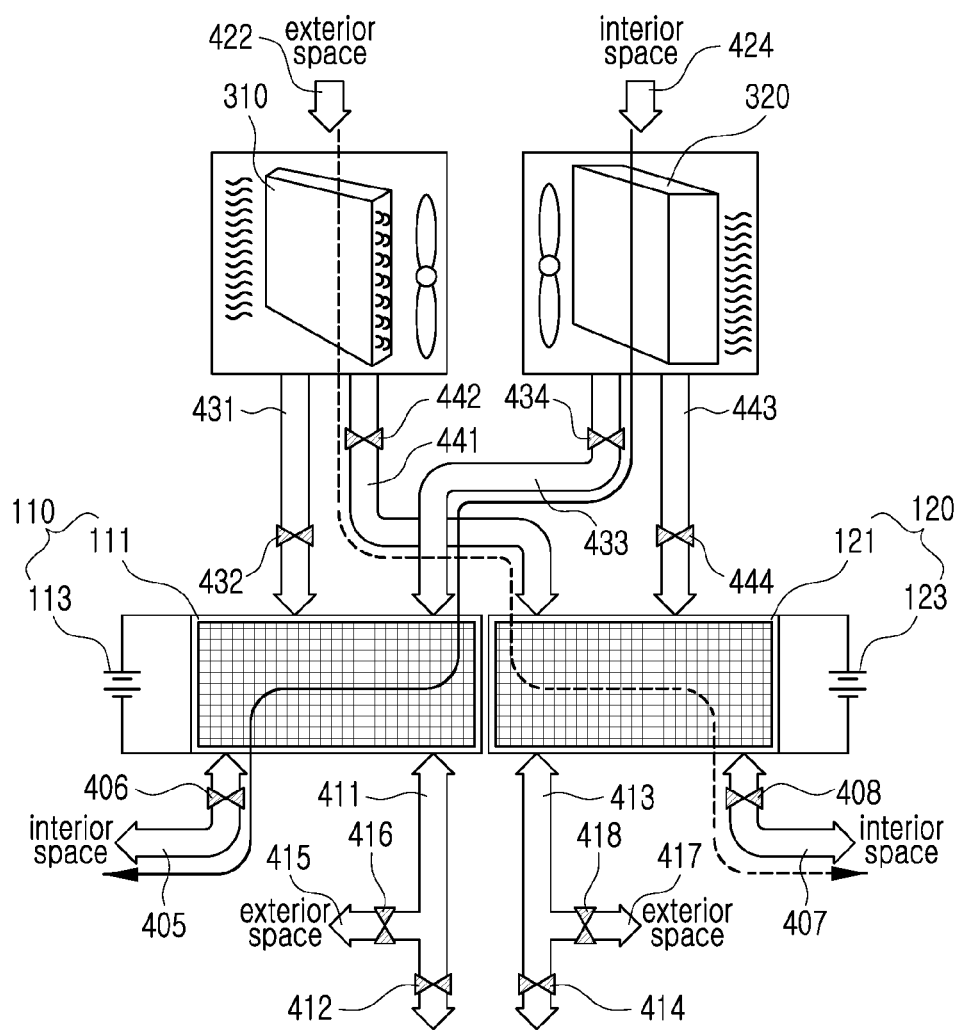
[FIG. 5a]

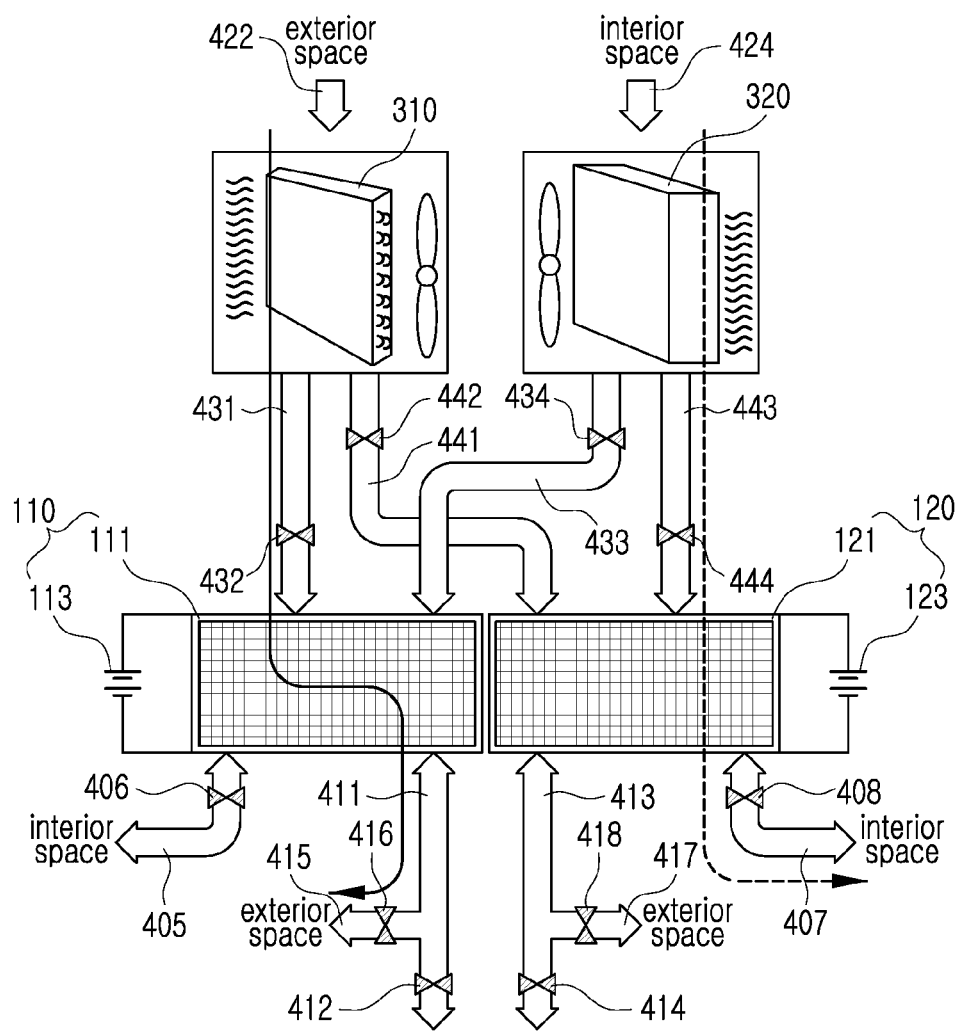
[FIG. 5b]

[FIG. 5c]
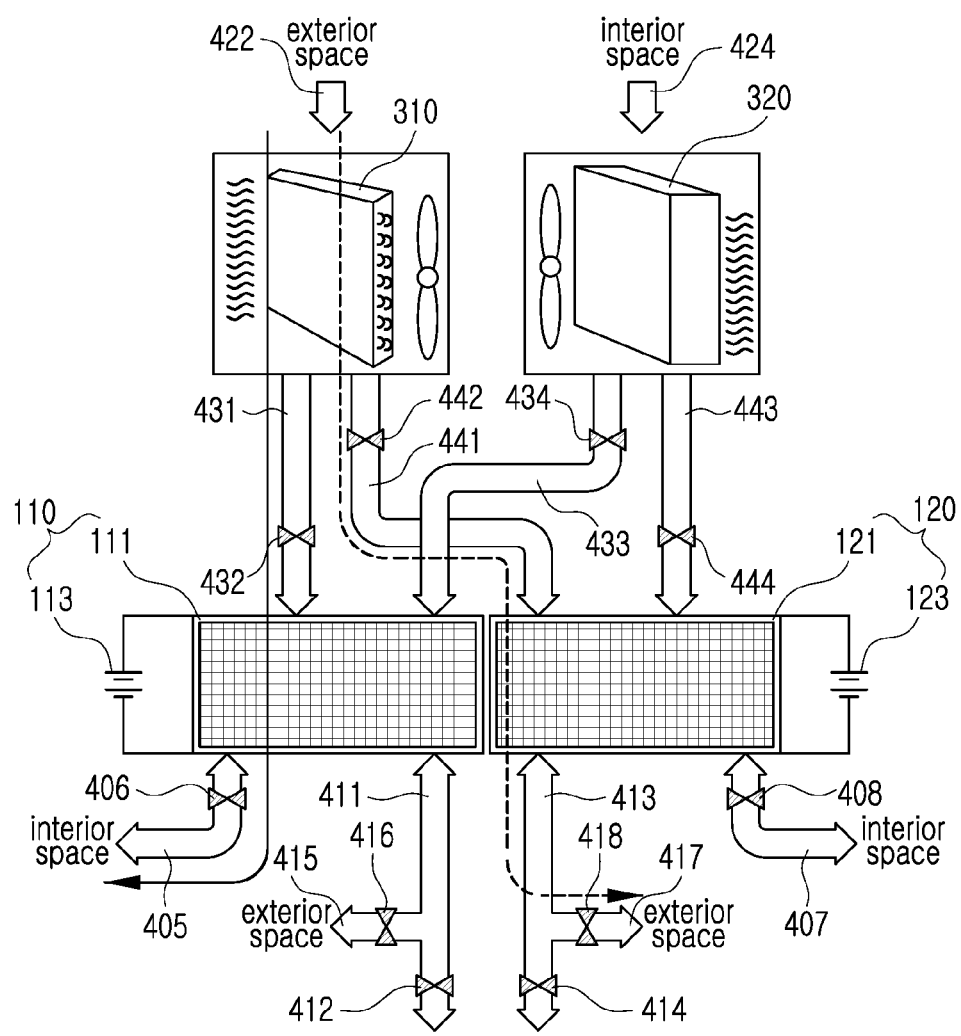

DEVICE FOR EXHAUSTING CARBON DIOXIDE ASSOCIATED WITH HEATING OR AIR-CONDITIONING DEVICE

CROSS-REFERENCE TO RELATED APPLICATION

This application claims priority to and the benefit of Korean Patent Application No. 10-2015-0015403 filed in the Korean Intellectual Property Office on Jan. 30, 2015, the entire contents of which are incorporated herein by reference.

FIELD OF THE INVENTION

The present invention relates a device for exhausting carbon dioxide in an interior space to an exterior space using a carbon dioxide adsorber having carbon dioxide adsorption and desorption characteristics depending on temperature.

BACKGROUND ART

A heating device or an air-conditioning device is widely used to regulate temperature of an interior space.

Recently, in addition to heating or cooling an interior space, a carbon dioxide exhausting device for exhausting carbon dioxide of an interior space is used. Such a carbon dioxide exhausting uses adsorbent such as zeolite, carbonate adsorbent having carbon dioxide adsorptive function and exhausts carbon dioxide of an interior space to an exterior space using carbon dioxide desorption and adsorption characteristics depending on temperature change.

A conventional carbon dioxide exhausting device needs a separate device for regulating the temperature of the adsorbent and has a poor efficiency so as to have a deteriorated energy efficiency, and has room for enhancing carbon dioxide adsorption efficiency.

DETAILED DESCRIPTION OF THE INVENTION

Technical Problem

The present invention has been made in an effort to provide a carbon dioxide exhausting device which is configured to associate with a heating device or an air-conditioning device so as to have an enhanced energy efficiency and an improved carbon dioxide adsorption efficiency.

Technical Solution

A device for exhausting carbon dioxide according to an exemplary embodiment of the present invention includes: at least one carbon dioxide adsorber which is configured to be able to be electrically heated; and a heat radiating part of a heating device for heating an interior space. A carbon dioxide exhausting process for exhausting carbon dioxide of an interior space to an exterior space is repeatedly performed. The carbon dioxide exhausting process includes: a first process of urging interior air to pass through the carbon dioxide adsorber and then to be introduced into an interior space such that carbon dioxide contained in the interior air is adsorbed to the carbon dioxide adsorber; a second process of urging interior air to pass sequentially through the carbon dioxide adsorber and the heat radiating part in a state that the carbon dioxide adsorber is electrically heated and to be exhausted to an exterior space such that carbon dioxide adsorbed to the carbon dioxide adsorber is exhausted to the exterior space after the first process; and a third process of urging exterior air to pass sequentially through the heat radiating part and the carbon dioxide adsorber and then to be introduced into an interior space after the second process.

The carbon dioxide adsorber may be provided in plural, and the carbon dioxide exhausting process may be performed in the respective carbon dioxide adsorbers with a predetermined time interval.

The device may further include: a temperature sensor detecting temperature of the carbon dioxide adsorber; a first carbon dioxide concentration sensor detecting concentration of carbon dioxide of interior air before passing the carbon dioxide adsorber; and a second carbon dioxide concentration sensor detecting concentration of carbon dioxide of air being supplied to an interior space after passing the carbon dioxide adsorber. Transition between the first to the third processes may be performed based on temperature change of the carbon dioxide adsorber which is detected by the temperature sensor and values of concentrations of carbon dioxide which are detected by the first and the second carbon dioxide concentration sensors.

If the temperature of the carbon dioxide adsorber becomes lower to reach a predetermined lower temperature limit while the third process is being performed, the third process may be transited to the first process; if the concentrations of carbon dioxide which are detected by the first and the second carbon dioxide concentration sensors become equal while the first process is being performed, the first process may be transited to the second process; and if the temperature of the carbon dioxide adsorber becomes higher to reach a predetermined upper temperature limit while the second process is being performed, the second process may be transited to the third process.

A device for exhausting carbon dioxide according to an exemplary embodiment of the present invention includes: at least one carbon dioxide adsorber which is configured to be able to be electrically heated; and a condenser and an evaporator of an air-conditioning device. A carbon dioxide exhausting process for exhausting carbon dioxide of an interior space to an exterior space is repeatedly performed. The carbon dioxide exhausting process includes: a first process of urging interior air to pass sequentially through the evaporator and the carbon dioxide adsorber and then to be introduced into an interior space such that carbon dioxide contained in the interior air is adsorbed to the carbon dioxide adsorber; a second process of urging exterior air to pass sequentially through the condenser and the carbon dioxide adsorber in a state that the carbon dioxide adsorber is electrically heated and to be exhausted to an exterior space such that carbon dioxide adsorbed to the carbon dioxide adsorber is exhausted to the exterior space after the first process; and a third process of urging exterior air to pass sequentially through the condenser and the carbon dioxide adsorber and then to be introduced into an interior space after the second process.

The carbon dioxide adsorber may be provided in plural, and the carbon dioxide exhausting process may be performed in the respective carbon dioxide adsorbers with a predetermined time interval.

The device may further includes: a temperature sensor detecting temperature of the carbon dioxide adsorber; a first carbon dioxide concentration sensor detecting concentration of carbon dioxide of interior air before passing the carbon dioxide adsorber; and a second carbon dioxide concentration sensor detecting concentration of carbon dioxide of air being supplied to an interior space after passing the carbon dioxide adsorber. Transition between the first to the third processes may performed based on temperature change of the carbon dioxide adsorber which is detected by the temperature sensor and values of concentrations of carbon dioxide which are detected by the first and the second carbon dioxide concentration sensors.

If the temperature of the carbon dioxide adsorber becomes lower to reach a predetermined lower temperature limit while the third process is being performed, the third process may be transited to the first process; if the concentrations of carbon dioxide which are detected by the first and the second carbon dioxide concentration sensors become equal while the first process is being performed, the first process may be transited to the second process; and if the temperature of the carbon dioxide adsorber becomes higher to reach a predetermined upper temperature limit while the second process is being performed, the second process may be transited to the third process.

A device for exhausting carbon dioxide according to another exemplary embodiment of the present invention includes: at least one carbon dioxide adsorber which is configured to be able to be electrically heated; a heat radiating part of a heating device for heating an interior space; and a condenser and an evaporator of an air-conditioning device. A carbon dioxide exhausting process for exhausting carbon dioxide of an interior space to an exterior space is repeatedly performed, the carbon dioxide exhausting process comprises a first carbon dioxide exhausting process using the heat radiating part and a second carbon dioxide exhausting process using the condenser and the evaporator, the first carbon dioxide exhausting process and the second carbon dioxide exhausting process is selectively performed. The first carbon dioxide exhausting process includes: a first process of urging interior air to pass through the carbon dioxide adsorber and then to be introduced into an interior space such that carbon dioxide contained in the interior air is adsorbed to the carbon dioxide adsorber; a second process of urging interior air to pass sequentially through the carbon dioxide adsorber and the heat radiating part in a state that the carbon dioxide adsorber is electrically heated and to be exhausted to an exterior space such that carbon dioxide adsorbed to the carbon dioxide adsorber is exhausted to the exterior space after the first process; and a third process of urging exterior air to pass sequentially through the heat radiating part and the carbon dioxide adsorber and then to be introduced into an interior space after the second process. The second carbon dioxide exhausting process includes: a first process of urging interior air to pass sequentially through the evaporator and the carbon dioxide adsorber and then to be introduced into an interior space such that carbon dioxide contained in the interior air is adsorbed to the carbon dioxide adsorber; a second process of urging exterior air to pass sequentially through the condenser and the carbon dioxide adsorber in a state that the carbon dioxide adsorber is electrically heated and to be exhausted to an exterior space such that carbon dioxide adsorbed to the carbon dioxide adsorber is exhausted to the exterior space after the first process; and a third process of urging exterior air to pass sequentially through the condenser and the carbon dioxide adsorber and then to be introduced into an interior space after the second process.

The carbon dioxide adsorber may be provided in plural, and the carbon dioxide exhausting process may be performed in the respective carbon dioxide adsorbers with a predetermined time interval.

The device may further include: a temperature sensor detecting temperature of the carbon dioxide adsorber; a first carbon dioxide concentration sensor detecting concentration of carbon dioxide of interior air before passing the carbon dioxide adsorber; and a second carbon dioxide concentration sensor detecting concentration of carbon dioxide of air being supplied to an interior space after passing the carbon dioxide adsorber. Transition between the first to the third processes may be performed based on temperature change of the carbon dioxide adsorber which is detected by the temperature sensor and values of concentrations of carbon dioxide which are detected by the first and the second carbon dioxide concentration sensors.

If the temperature of the carbon dioxide adsorber becomes lower to reach a predetermined lower temperature limit while the third process is being performed, the third process may be transited to the first process; if the concentrations of carbon dioxide which are detected by the first and the second carbon dioxide concentration sensors become equal while the first process is being performed, the first process may be transited to the second process; and if the temperature of the carbon dioxide adsorber becomes higher to reach a predetermined upper temperature limit while the second process is being performed, the second process may be transited to the third process.

Advantageous Effects

According to the present invention, since a carbon dioxide exhausting device is configured to associate with a heating device or an air-conditioning device, an energy efficiency and a carbon dioxide adsorption efficiency can be improved.

BRIEF DESCRIPTION OF DRAWINGS

FIG. 1 is a drawing for schematically showing a carbon dioxide exhausting device according to an embodiment of the present invention.

FIG. 2 is a drawing for explaining operations of a carbon dioxide exhausting device of FIG. 1.

FIG. 3 is a drawing for schematically showing a carbon dioxide exhausting device according to another embodiment of the present invention.

FIG. 4*a* to FIG. 4*c* are drawings for explaining operations of a carbon dioxide exhausting device of FIG. 3.

FIG. 5*a* to FIG. 5*c* are drawings for schematically showing a carbon dioxide exhausting device according to yet another embodiment of the present invention.

DETAILED DESCRIPTION OF THE EMBODIMENTS

Embodiments of the present invention will be described in detail with reference to the accompanying drawings.

A device for exhausting carbon dioxide according to an embodiment of the present invention plays a function of exhausting carbon dioxide of interior air to an exterior space and uses a heating device or an air-conditioning device for heating or cooling of interior air. An embodiment shown in FIG. 1 uses both a heating device and an air-conditioning device, an embodiment shown in FIG. 2 uses a heating device, and an embodiment shown in FIG. 3 uses an air-conditioning device.

A device for exhausting carbon dioxide of FIG. 1 corresponds to a combination of devices of FIG. 2 and FIG. 3 and may selectively use a heating device and an air-conditioning device. A device for exhausting carbon dioxide of FIG. 1 operates in the substantially same way with a device of FIG. 2 when it uses a heating device and operates in the substantially same way with a device of FIG. 3 when it uses an air-conditioning device.

Referring to FIG. 1 to FIG. 3, a device for exhausting carbon dioxide according to an embodiment of the present invention includes at least one carbon dioxide adsorber 110 and 120. Although two carbon dioxide adsorbers 110 and 120 are exemplarily shown in the drawing, the number of the carbon dioxide adsorbers 110 and 120 is not limited thereto.

The carbon dioxide adsorbers 110 and 120 are configured to be electrically heated, and it operates to expedite the desorption of carbon dioxide when the temperature thereof increases due to the electrical heating and operates to expedite the adsorption of carbon dioxide when the temperature thereof decreases without being heated. The carbon dioxide adsorbers 110 and 120 may be realized as any carbon dioxide adsorber which has characteristics of adsorption and desorption of carbon dioxide which are variable depending on temperature change thereof. For example, the carbon dioxide adsorbers 110 and 120 may include carbon monolith beds 111 and 121, which are respectively formed of carbon monolith, and electrical heaters 113 and 1213 which are formed to supply electricity thereto to heat the same. At this time, not shown in the drawings, switches for selectively operating the electrical heaters 113 and 123 may be provided, and a controller (not shown) for controls an overall operation of a device for exhausting carbon dioxide controls on/off operations of switches to control the operations of the electrical heaters 113 and 123.

A heat radiating part 200 of a heating device for heating an interior may be provided. For example, the heat radiating part 200 may be a radiator which is configured to transfer heat to air of an interior space to increase the temperature of air of an interior space.

Further, a condenser 310 and an evaporator 320 of an air-conditioning device for cooling air of an interior space may be provided. As a conventional air-conditioning device, the condenser 310 is a part which is provided at an exterior space to cause coolant to be condensed so as to radiate heat and the evaporator 320 is a part which is provide at an interior space to cause coolant to be evaporated so as to absorb heat in a surrounding area.

A process of exhausting carbon dioxide may be performed by using the heat radiating part 200 of the heating device and may also be performed by using the condenser 310 and the evaporator 320 of the air-conditioning device. That is, in a device for exhausting carbon dioxide of FIG. 1, a process of exhausting carbon dioxide may be performed by using selectively one of the heat radiating part 200 of the heating device and the condenser 310 and the evaporator 320 of the air-conditioning device, and in a device for exhausting carbon dioxide of FIG. 2, a process of exhausting carbon dioxide may be performed by using selectively one of the heat radiating part 200 of the heating device, and in a device for exhausting carbon dioxide of FIG. 3, a process of exhausting carbon dioxide may be performed by using the condenser 310 and the evaporator 320 of the air-conditioning device.

Hereinafter, a process of exhausting carbon dioxide using the heat radiating part 200 of the heating device will be described with reference to FIG. 1, FIG. 2 and FIG. 4a to FIG. 4c.

As shown in FIG. 1 and FIG. 2, air passageways 401 and 403 for introducing interior air into carbon monolith beds 111 and 121 are provided, and valves 402 and 404 for selectively opening/closing the air passageways 401 and 403 may be provided respectively in the air passageways 401 and 403. Further, air passageways 405 and 407 for discharging air inside the carbon monolith beds 111 and 121 into an interior space are provided, and valves 406 and 408 for selectively opening/closing the air passageways 405 and 407 are respectively in the air passageways 405 and 407. Further, air passageways 411 and 413 connecting the carbon monolith beds 111 and 121 the heat radiating part 200 may be provided, and valves 412 and 414 for selectively opening/closing the air passageways 411 and 413 are respectively provided to the air passageways 411 and 413. In addition, air passageways 415 and 417 for connecting the carbon monolith beds 111 and 121 to an exterior space may be provided, and valves 416 and 418 for selectively opening/closing the air passageways 415 and 417 may be provided to the air passageways 415 and 417. Further, an air passageway 421 for discharging air in the heat radiating part 200 into an exterior space and an air passageway 423 for introducing exterior air into an interior space may be provided. At this time, not shown in the drawings, these valves may be controlled to be on/off by a controller. Also, not shown in the drawings, an air blowing fan for inducing air flow may be provided, and the air blowing fan may also be controlled by a controller.

The exhausting of carbon dioxide is performed by repeatedly performing a carbon dioxide exhausting process being comprised of three concrete processes (first to third processes). Although the case in which two carbon dioxide adsorbers 110 and 120 are provided is shown in FIG. 4, the carbon dioxide exhausting process which is performed only by the carbon dioxide adsorber 110 is shown, but when the two carbon dioxide adsorbers 110 and 120 operate together, the carbon dioxide exhausting processes are sequentially performed with a predetermined time interval in the two carbon dioxide adsorbers 110 and 120 repeatedly.

Referring to FIG. 4a, a first process is a process for adsorbing carbon dioxide contained in interior air to the carbon dioxide adsorber 110, and interior air is passed through the carbon dioxide adsorber 110 and is then introduced into an interior space again such that carbon dioxide contained in interior air is adsorbed by the carbon dioxide adsorber 110. At this time, the carbon monolith bed 111 of the carbon dioxide adsorber 110 is in a state of being cooled by a third process which will be explained later, and while interior air passes through the cooled carbon monolith bed 111, carbon dioxide contained in interior air is adsorbed by the carbon monolith bed 111. Accordingly, the concentration of carbon dioxide of interior air is decreased while interior air passes through the carbon monolith bed 111, and then interior air is introduced into the interior space again. For such air flow, the valves designated by reference numerals 402 and 406 are opened, and the valves designated by reference numerals 412 and 416 are closed, and accordingly interior air flowing into the carbon dioxide adsorber 110 passes through the same and is then introduced again into an interior space via the air passageway designated by reference numeral 405.

Referring to FIG. 4b, a second process is a process for exhausting carbon dioxide adsorbed by the carbon dioxide adsorber 110 in the first process, and in a state that the carbon dioxide adsorber 110 is electrically heated, interior air passes through the heated carbon dioxide adsorber 110 and is then discharged into an exterior space, such that carbon dioxide being adsorbed in the carbon dioxide adsorber 110 is discharged to an exterior space. That is, in a state that the carbon monolith bed 111 is heated by operating the electrical heater 113, air in an interior space is urged to pass through the carbon monolith bed 111 and to be discharged to an exterior space, and at this time since the carbon monolith bed 111 is heated and is in a state that the temperature thereof is increased, the desorption of carbon dioxide occurs and the desorbed carbon dioxide is discharged to an exterior space together with interior air. For such air flow, the valves designated by reference numerals 402 and 412 are opened, and the valves designated by reference numerals 406 and 416 are closed, and accordingly interior air flowing into the carbon dioxide adsorber 110 passes sequentially through the carbon dioxide adsorber 110 and the heat radiating part 200 and is then discharged into an exterior space via the air passageway designated by reference numeral 421.

Referring to FIG. 4c, a third process is a process for cooling the carbon dioxide adsorber 110 using exterior air, and exterior air is urged to pass through the heat radiating part 200 and the carbon dioxide adsorber 110 and to be introduced into an interior. During this process, the carbon dioxide adsorber 110 which was heated in the second process is cooled by exterior air. For such air flow, the valves designated by reference numerals 412 and 406 are opened, and the valves designated by reference numerals 402 and 416 are closed, and accordingly exterior air being introduced via the air passageway designated by reference numeral 423 passes through the heat radiating part 200 and is introduced into the carbon dioxide adsorber 110 via the air passageway designated by the reference numeral 411 and is then introduced into an interior space via the air passageway designated by the reference numeral 405.

After the carbon dioxide adsorber 110 is cooled by the third process, the first process is again performed, so the removal of carbon dioxide from interior air can be obtained as mentioned above.

The transition of the first to third processes of FIG. 4a to FIG. 4c may be performed on the basis of the temperature of the carbon dioxide adsorber 110, the concentration of carbon dioxide of air before passing through the carbon dioxide adsorber 110 and the concentration of carbon dioxide of air after passing through the carbon dioxide adsorber 110.

For example, a temperature sensor (not shown) for detecting the temperature of the carbon dioxide adsorber 110, a first carbon dioxide concentration sensor (not shown) for detecting the concentration of carbon dioxide of interior air before passing through the carbon dioxide adsorber 110, and a second carbon dioxide concentration sensor (not shown) for detecting the concentration of carbon dioxide of air which is introduced into an interior space after having passed through the carbon dioxide adsorber 110 may be provided. At this time, the transition of the first to third processes may be performed on the basis of temperature change of the carbon dioxide adsorber 110 which is detected by the temperature sensor and values of the concentrations of carbon dioxide which are detected by the first and the second carbon dioxide concentration sensors.

In detail, if the temperature of the carbon dioxide adsorber 110 becomes lower to reach a predetermined lower temperature limit while the third process is being performed, the process may be transited to the first process. Meanwhile, if the concentrations of carbon dioxide which are detected by the first and the second carbon dioxide concentration sensors become equal while the first process is being performed, the process may be transited to the second process. Meanwhile, if the temperature of the carbon dioxide adsorber 110 becomes higher to reach a predetermined upper temperature limit while the second process is being performed, the process may be transited to the third process.

For example, the predetermined upper temperature limit may be set as a value which is obtained by adding 30° C. to the predetermined lower temperature limit. As a detailed example, the predetermined lower temperature limit may be set as a temperature value in a range of −5 to 0° C., and the predetermined upper temperature limit may be set as a temperature value in a range of 25 to 30° C.

As described above, by repeatedly performing the carbon dioxide exhausting process which is comprised of the first to third processes, carbon dioxide in an interior space can be exhausted to the exterior space.

Meanwhile, in case that a plurality of carbon dioxide adsorbers 110 and 120 are provided, the above-described carbon dioxide exhausting process is separately performed in the respective carbon dioxide adsorbers 110 and 120, and the carbon dioxide exhausting processes may be performed with a predetermined time interval between the carbon dioxide adsorbers 110 and 120. For example, as shown in dotted lines in FIG. 4a to FIG. 4c, while the first process is being performed in the carbon dioxide adsorber 110, the third process may be being performed in the carbon dioxide adsorber 120 (air flow is shown with a dotted line), while the second process is being performed in the carbon dioxide adsorber 110, the first process may be being performed in the carbon dioxide adsorber 120 (air flow is shown with a dotted line), and while the third process is being performed in the carbon dioxide adsorber 110, the second process may be being performed in the carbon dioxide adsorber 120 (air flow is shown with a dotted line).

Hereinafter, referring to FIG. 1, FIG. 3 and FIG. 5a to FIG. 5c, a carbon dioxide exhausting process using the condenser 310 and the evaporator 320 of an air-conditioning device will be described.

As shown in FIG. 1 and FIG. 3, an air passageways 422 for introducing exterior air into the condenser 310 and an air passageway 424 for introducing interior air into the evaporator 320 are provided. Further, air passageways 431 and 433 connecting the condenser 310 and the evaporator 320 respectively to the carbon dioxide adsorber 110 are provided, and valves 432 and 434 for selectively opening/closing the air passageways 431 and 433 may be provided respectively in the air passageways 431 and 433. Similarly, in case that a carbon dioxide adsorber designated by reference numeral 120 is additionally provided, air passageways 441 and 443 connecting the condenser 310 and the evaporator 320 respectively to the carbon dioxide adsorber 140 are provided, and valves 442 and 444 for selectively opening/closing the air passageways 441 and 443 may be provided respectively in the air passageways 441 and 443. Explanations for air passageways which are connected to the carbon dioxide adsorbers 110 and 120 and valves, which are the same with FIG. 3, will be omitted.

In a carbon dioxide exhausting processing using the condenser 310 and the evaporator 320 of an air-conditioning device, the exhausting of carbon dioxide is performed by repeatedly performing three concrete processes (first to third processes). Although the case in which two carbon dioxide adsorbers 110 and 120 are provided is shown in FIG. 3 and FIG. 5, the carbon dioxide exhausting process which is performed only by the carbon dioxide adsorber 110 is shown, but when the two carbon dioxide adsorbers 110 and 120 operate together, the carbon dioxide exhausting processes are sequentially performed with a predetermined time interval in the two carbon dioxide adsorbers 110 and 120 repeatedly.

Referring to FIG. 5a, a first process is a process for adsorbing carbon dioxide contained in interior air to the carbon dioxide adsorber 110, and interior air which is introduced via the air passageway 424 is passed through the evaporator 320 and the carbon dioxide adsorber 110 and is then introduced into an interior space again such that carbon dioxide contained in interior air is adsorbed by the carbon dioxide adsorber 110. At this time, the carbon monolith bed 111 of the carbon dioxide adsorber 110 is in a state of being cooled by a third process which will be explained later, and while interior air passes through the cooled carbon monolith bed 111, carbon dioxide contained in interior air is adsorbed by the carbon monolith bed 111. Accordingly, the concentration of carbon dioxide of interior air is decreased while interior air passes through the carbon monolith bed 111, and then interior air is introduced into the interior space again. For such air flow, the valves designated by reference numerals 434 and 406 are opened, and the valves designated by reference numerals 432 and 416 are closed, and accordingly interior air which is introduced via the air passageway designated by the reference numeral 424 passes sequentially the evaporator 320 and the carbon dioxide adsorber 110 and is then introduced again into an interior space via the air passageway designated by reference numeral 405.

Referring to FIG. 5b, a second process is a process for exhausting carbon dioxide adsorbed by the carbon dioxide adsorber 110 in the first process, and in a state that the carbon dioxide adsorber 110 is electrically heated, exterior air passes sequentially through the condenser 310 and the carbon dioxide adsorber 110 and is then discharged into an exterior space, such that carbon dioxide being adsorbed in the carbon dioxide adsorber 110 is discharged to an exterior space. That is, in a state that the carbon monolith bed 111 is heated by operating the electrical heater 113, air in an exterior space is urged to pass through the carbon monolith bed 111 and to be discharged to an exterior space, and at this time since the carbon monolith bed 111 is heated and is in a state that the temperature thereof is increased, the desorption of carbon dioxide occurs and the desorbed carbon dioxide is discharged to an exterior space together with exterior air. For such air flow, the valves designated by reference numerals 432 and 416 are opened, and the valves designated by reference numerals 434 and 406 are closed, and accordingly exterior air which has been introduced through the air passageway designated by the reference numeral 422 passes sequentially through the condenser 310 and the carbon dioxide adsorber 110 and is then discharged into an exterior space via the air passageway designated by reference numeral 415.

Referring to FIG. 5c, a third process is a process for cooling the carbon dioxide adsorber 110 using exterior air, and exterior air is urged to pass through the condenser 310 and the carbon dioxide adsorber 110 and to be introduced into an interior space. During this process, the carbon dioxide adsorber 110 which was heated in the second process is cooled by exterior air. For such air flow, the valves designated by reference numerals 432 and 406 are opened, and the valves designated by reference numerals 434 and 416 are closed, and accordingly exterior air being introduced via the air passageway designated by reference numeral 422 passes through the condenser 310 and the carbon dioxide adsorber 110 and is then introduced into an interior space via the air passageway designated by the reference numeral 405.

The transition of the first to third processes of FIG. 5a to FIG. 5c may be performed on the basis of the temperature of the carbon dioxide adsorber 110, the concentration of carbon dioxide of air before passing through the carbon dioxide adsorber 110 and the concentration of carbon dioxide of air after passing through the carbon dioxide adsorber 110.

For example, a temperature sensor (not shown) for detecting the temperature of the carbon dioxide adsorber 110, a first carbon dioxide concentration sensor (not shown) for detecting the concentration of carbon dioxide of interior air before passing through the carbon dioxide adsorber 110, and a second carbon dioxide concentration sensor (not shown) for detecting the concentration of carbon dioxide of air which is introduced into an interior space after having passed through the carbon dioxide adsorber 110 may be provided. At this time, the transition of the first to third processes may be performed on the basis of temperature change of the carbon dioxide adsorber 110 which is detected by the temperature sensor and values of the concentrations of carbon dioxide which are detected by the first and the second carbon dioxide concentration sensors.

In detail, if the temperature of the carbon dioxide adsorber 110 becomes lower to reach a predetermined lower temperature limit while the third process is being performed, the process may be transited to the first process. Meanwhile, if the concentrations of carbon dioxide which are detected by the first and the second carbon dioxide concentration sensors become equal while the first process is being performed, the process may be transited to the second process. Meanwhile, if the temperature of the carbon dioxide adsorber 110 becomes higher to reach a predetermined upper temperature limit while the second process is being performed, the process may be transited to the third process.

For example, the predetermined upper temperature limit may be set as a value which is obtained by adding 30° C. to the predetermined lower temperature limit. As a detailed example, the predetermined lower temperature limit may be set as a temperature value in a range of 25 to 30° C., and the predetermined upper temperature limit may be set as a temperature value in a range of 55 to 60° C.

After the carbon dioxide adsorber 110 is cooled by the third process, the first process is again performed, so the removal of carbon dioxide from interior air can be obtained as mentioned above.

As described above, by repeatedly performing the carbon dioxide exhausting process which is comprised of the first to third processes, carbon dioxide in an interior space can be exhausted to the exterior space.

Meanwhile, in case that a plurality of carbon dioxide adsorbers 110 and 120 are provided, the above-described carbon dioxide exhausting process is separately performed in the respective carbon dioxide adsorbers 110 and 120, and the carbon dioxide exhausting processes may be performed with a predetermined time interval between the carbon dioxide adsorbers 110 and 120. For example, as shown in dotted lines in FIG. 5a to FIG. 5c, while the first process is being performed in the carbon dioxide adsorber 110, the third process may be being performed in the carbon dioxide adsorber 120 (air flow is shown with a dotted line), while the second process is being performed in the carbon dioxide adsorber 110, the first process may be being performed in the carbon dioxide adsorber 120 (air flow is shown with a dotted line), and while the third process is being performed in the carbon dioxide adsorber 110, the second process may be being performed in the carbon dioxide adsorber 120 (air flow is shown with a dotted line).

As described above, a carbon dioxide exhausting process may be performed using the heat radiating part of the heating device as shown in FIG. 2 and FIG. 4, and a carbon dioxide exhausting process may be performed using the condenser and the evaporator of the air-conditioning device as shown in FIG. 3 and FIG. 5. Meanwhile, in case that the heat radiating part of the heating device and the condenser and the evaporator of the air-conditioning device are present together, one of a carbon dioxide exhausting process using the heat radiating part of the heating device and a carbon dioxide exhausting process using the condenser and the evaporator of the air-conditioning device can be selectively performed.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

The invention claimed is:

1. A device for exhausting carbon dioxide comprising:
at least one carbon dioxide adsorber which is configured to be able to be electrically heated;
a heat radiating part of a heating device for heating an interior space;
a temperature sensor detecting temperature of the carbon dioxide adsorber;
a first carbon dioxide concentration sensor detecting concentration of carbon dioxide of interior air before passing the carbon dioxide adsorber; and
a second carbon dioxide concentration sensor detecting concentration of carbon dioxide of air being supplied to the interior space after passing the carbon dioxide adsorber.

2. The device of claim 1, wherein the device is configured to repeatedly perform a carbon dioxide exhausting process for exhausting carbon dioxide of the interior space to an exterior space, and the carbon dioxide exhausting process comprises:
a first process of urging interior air to pass through the carbon dioxide adsorber and then to be introduced into the interior space such that carbon dioxide contained in the interior air is adsorbed to the carbon dioxide adsorber;
a second process of urging interior air to pass sequentially through the carbon dioxide adsorber and the heat radiating part in a state that the carbon dioxide adsorber is electrically heated and to be exhausted to the exterior space such that carbon dioxide adsorbed to the carbon dioxide adsorber is exhausted to the exterior space after the first process; and
a third process of urging exterior air to pass sequentially through the heat radiating part and the carbon dioxide adsorber and then to be introduced into the interior space after the second process,
wherein transition between the first to the third processes is performed based on temperature change of the carbon dioxide adsorber which is detected by the temperature sensor and values of concentrations of carbon dioxide which are detected by the first and the second carbon dioxide concentration sensors.

3. The device of claim 2, wherein the carbon dioxide adsorber is provided in plural, and the carbon dioxide exhausting process is performed in the respective carbon dioxide adsorbers with a predetermined time interval.

4. The device of claim 2, wherein if the temperature of the carbon dioxide adsorber becomes lower to reach a predetermined lower temperature limit while the third process is being performed, the third process is transited to the first process; if the concentrations of carbon dioxide which are detected by the first and the second carbon dioxide concentration sensors become equal while the first process is being performed, the first process is transited to the second process; and if the temperature of the carbon dioxide adsorber becomes higher to reach a predetermined upper temperature limit while the second process is being performed, the second process is transited to the third process.

5. A device for exhausting carbon dioxide comprising:
at least one carbon dioxide adsorber which is configured to be able to be electrically heated;
a condenser and an evaporator of an air-conditioning device; and
a temperature sensor detecting temperature of the carbon dioxide adsorber;
a first carbon dioxide concentration sensor detecting concentration of carbon dioxide of interior air before passing the carbon dioxide adsorber; and
a second carbon dioxide concentration sensor detecting concentration of carbon dioxide of air being supplied to an interior space after passing the carbon dioxide adsorber.

6. The device of claim 5, wherein the device is configured to repeatedly perform a carbon dioxide exhausting process for exhausting carbon dioxide of an interior space to an exterior space, and the carbon dioxide exhausting process comprises:
a first process of urging interior air to pass sequentially through the evaporator and the carbon dioxide adsorber and then to be introduced into the interior space such that carbon dioxide contained in the interior air is adsorbed to the carbon dioxide adsorber;
a second process of urging exterior air to pass sequentially through the condenser and the carbon dioxide adsorber in a state that the carbon dioxide adsorber is electrically heated and to be exhausted to the exterior space such that carbon dioxide adsorbed to the carbon dioxide adsorber is exhausted to the exterior space after the first process; and
a third process of urging exterior air to pass sequentially through the condenser and the carbon dioxide adsorber and then to be introduced into the interior space after the second process,
wherein transition between the first to the third processes is performed based on temperature change of the carbon dioxide adsorber which is detected by the temperature sensor and values of concentrations of carbon dioxide which are detected by the first and the second carbon dioxide concentration sensors.

7. The device of claim 6, wherein the carbon dioxide adsorber is provided in plural, and the carbon dioxide exhausting process is performed in the respective carbon dioxide adsorbers with a predetermined time interval.

8. The device of claim 6, wherein if the temperature of the carbon dioxide adsorber becomes lower to reach a predetermined lower temperature limit while the third process is being performed, the third process is transited to the first process; if the concentrations of carbon dioxide which are detected by the first and the second carbon dioxide concentration sensors become equal while the first process is being performed, the first process is transited to the second process; and if the temperature of the carbon dioxide adsorber becomes higher to reach a predetermined upper temperature limit while the second process is being performed, the second process is transited to the third process.

9. A device for exhausting carbon dioxide comprising:
at least one carbon dioxide adsorber which is configured to be able to be electrically heated;

a heat radiating part of a heating device for heating an interior space;

a condenser and an evaporator of an air-conditioning device;

a temperature sensor detecting temperature of the carbon dioxide adsorber, a first carbon dioxide concentration sensor detecting concentration of carbon dioxide of interior air before passing the carbon dioxide adsorber; and a second carbon dioxide concentration sensor detecting concentration of carbon dioxide of air being supplied to the interior space after passing the carbon dioxide adsorber.

10. The device of claim 9, wherein the device is configured to repeatedly perform a carbon dioxide exhausting process for exhausting carbon dioxide of the interior space to an exterior space, wherein the carbon dioxide exhausting process comprises a first carbon dioxide exhausting process using the heat radiating part and a second carbon dioxide exhausting process using the condenser and the evaporator, wherein the first carbon dioxide exhausting process and the second carbon dioxide exhausting process is selectively performed, wherein the first carbon dioxide exhausting process comprises:

a first process of urging interior air to pass through the carbon dioxide adsorber and then to be introduced into the interior space such that carbon dioxide contained in the interior air is adsorbed to the carbon dioxide adsorber;

a second process of urging interior air to pass sequentially through the carbon dioxide adsorber and the heat radiating part in a state that the carbon dioxide adsorber is electrically heated and to be exhausted to the exterior space such that carbon dioxide adsorbed to the carbon dioxide adsorber is exhausted to the exterior space after the first process; and a third process of urging exterior air to pass sequentially through the heat radiating part and the carbon dioxide adsorber and then to be introduced into the interior space after the second process, wherein the second carbon dioxide exhausting process comprises:

a first process of urging interior air to pass sequentially through the evaporator and the carbon dioxide adsorber and then to be introduced into the interior space such that carbon dioxide contained in the interior air is adsorbed to the carbon dioxide adsorber;

a second process of urging exterior air to pass sequentially through the condenser and the carbon dioxide adsorber in a state that the carbon dioxide adsorber is electrically heated and to be exhausted to the exterior space such that carbon dioxide adsorbed to the carbon dioxide adsorber is exhausted to the exterior space after the first process; and a third process of urging exterior air to pass sequentially through the condenser and the carbon dioxide adsorber and then to be introduced into the interior space after the second process, wherein transition between the first to the third processes is performed based on temperature change of the carbon dioxide adsorber which is detected by the temperature sensor and values of concentrations of carbon dioxide which are detected by the first and the second carbon dioxide concentration sensors.

11. The device of claim 10, wherein the carbon dioxide adsorber is provided in plural, and the carbon dioxide exhausting process is performed in the respective carbon dioxide adsorbers with a predetermined time interval.

12. The device of claim 10, wherein if the temperature of the carbon dioxide adsorber becomes lower to reach a predetermined lower temperature limit while the third process is being performed, the third process is transited to the first process; if the concentrations of carbon dioxide which are detected by the first and the second carbon dioxide concentration sensors become equal while the first process is being performed, the first process is transited to the second process; and if the temperature of the carbon dioxide adsorber becomes higher to reach a predetermined upper temperature limit while the second process is being performed, the second process is transited to the third process.

* * * * *